United States Patent [19]

Morine et al.

[11] Patent Number: 4,529,107
[45] Date of Patent: Jul. 16, 1985

[54] DISPENSING APPARATUS WITH RECIPROCATING BLADE

[76] Inventors: Richard L. Morine, 2256 Toniwood La., Palm Harbor, Fla. 33563; James J. Hokes, 4313 Carrollwood Village Dr., Tampa, Fla. 33624

[21] Appl. No.: 474,295

[22] Filed: Mar. 11, 1983

[51] Int. Cl.³ ............................................. B65D 88/26
[52] U.S. Cl. .................................... 222/314; 222/350
[58] Field of Search ............... 221/314, 342, 343, 346, 221/350, 347, 625, 408, 345, 349; 99/494; 222/310, 410, 414

[56] References Cited

U.S. PATENT DOCUMENTS

| | | | |
|---|---|---|---|
| 640,263 | 1/1900 | Bernhard | 222/314 |
| 2,548,245 | 4/1951 | Stevens et al. | 222/350 |
| 3,606,099 | 1/1970 | Benson | 222/414 X |
| 3,620,423 | 11/1971 | Dalgleish | 222/414 |

FOREIGN PATENT DOCUMENTS 1597946  6/1970  France ............................... 222/314

Primary Examiner—Stanley H. Tollberg

[57] ABSTRACT

Apparatus for dispensing a comparatively fine, particulate material uniformly over a subjacent surface. The disclosed apparatus comprises a hopper assembly adopted to be mounted over the surface. The hopper assembly has sides defining a downwardly open, horizontally extending, elongated discharge mouth. An elongated, cylindrical drum member extends the length of the mouth. Wiper blades extend from the sides of the hopper assembly into engagement with the drum. A multiplicity, of narrow, shallow grooves extend circumferentially about the drum. The grooves are sized such that the particulate material will not normally flow therethrough except upon rotation of the drum. For this reason structure is provided for selectively rotating the drum in at least a first direction to cause discharge of the particulate material. To produce uniform dispersion of the particulate material, divider-deflector members are associated with each groove.

4 Claims, 8 Drawing Figures

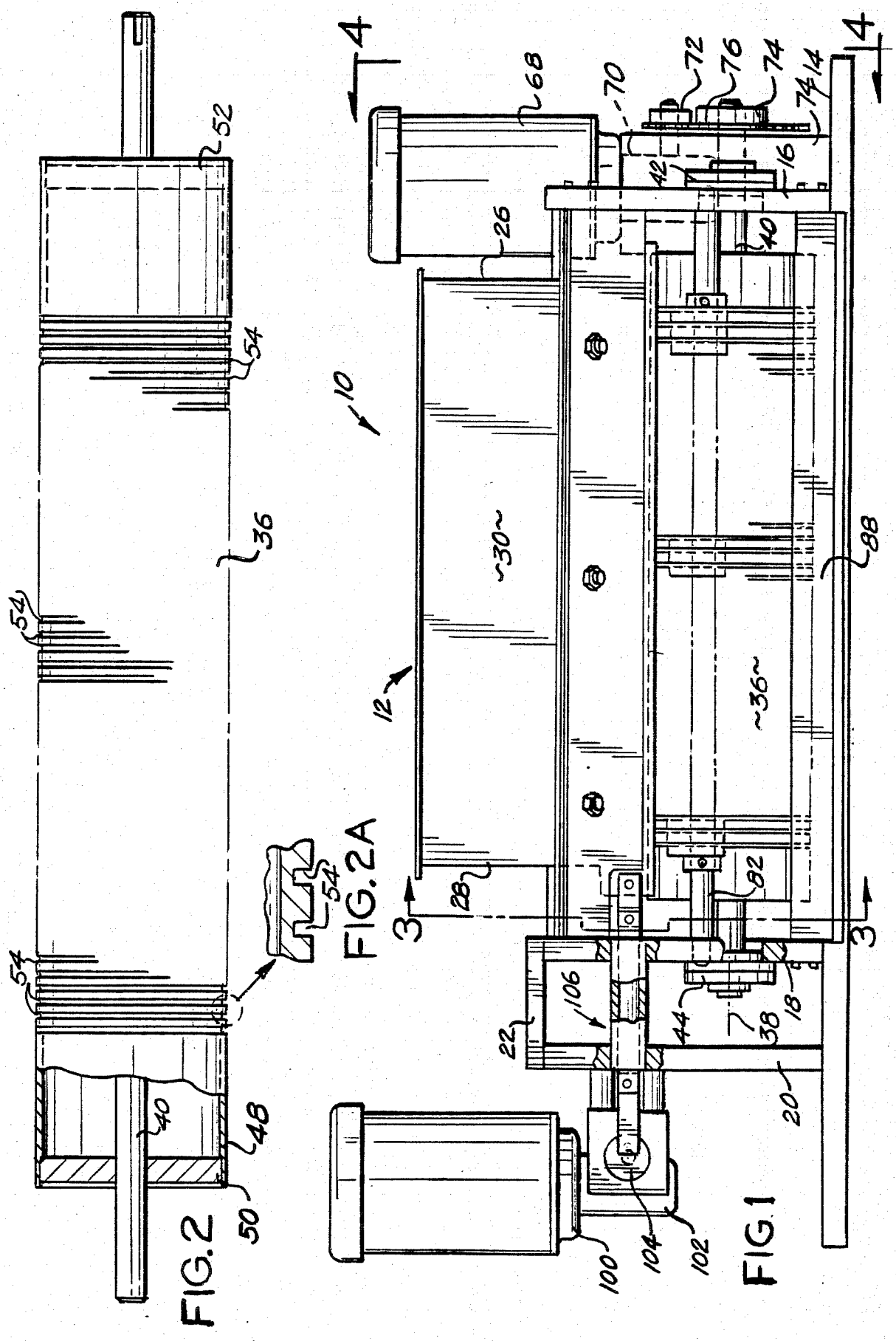

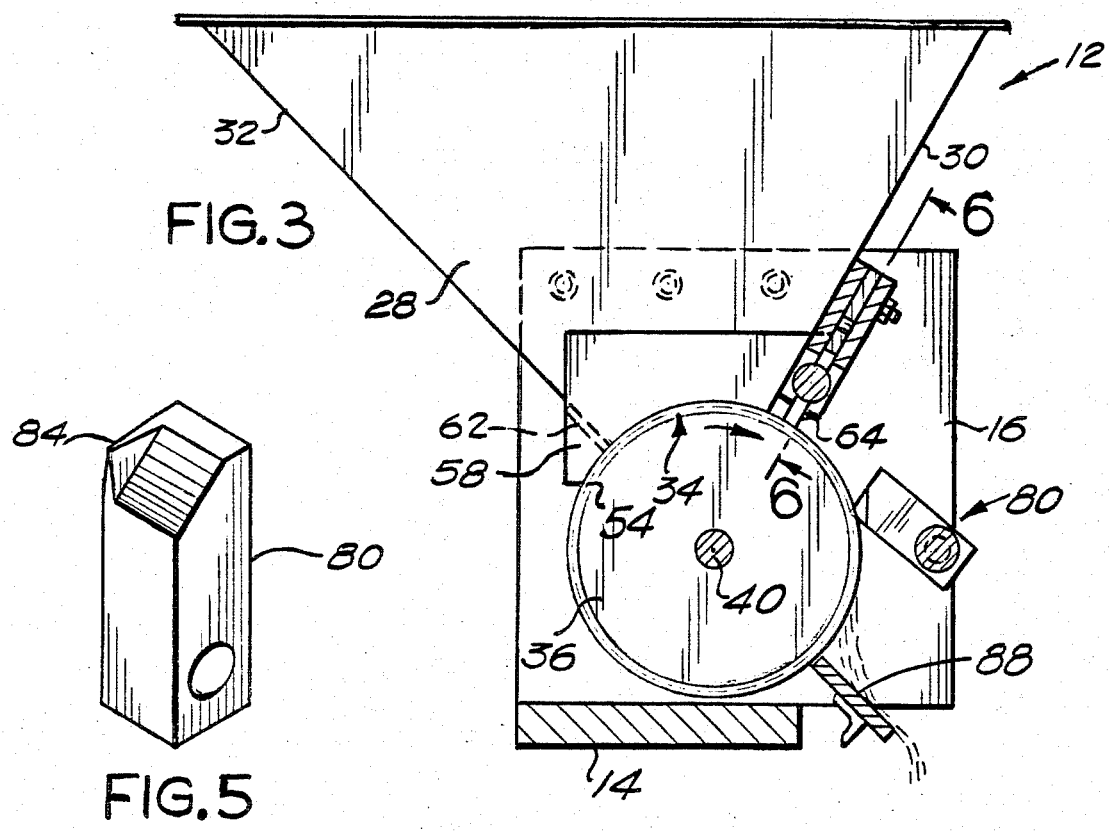
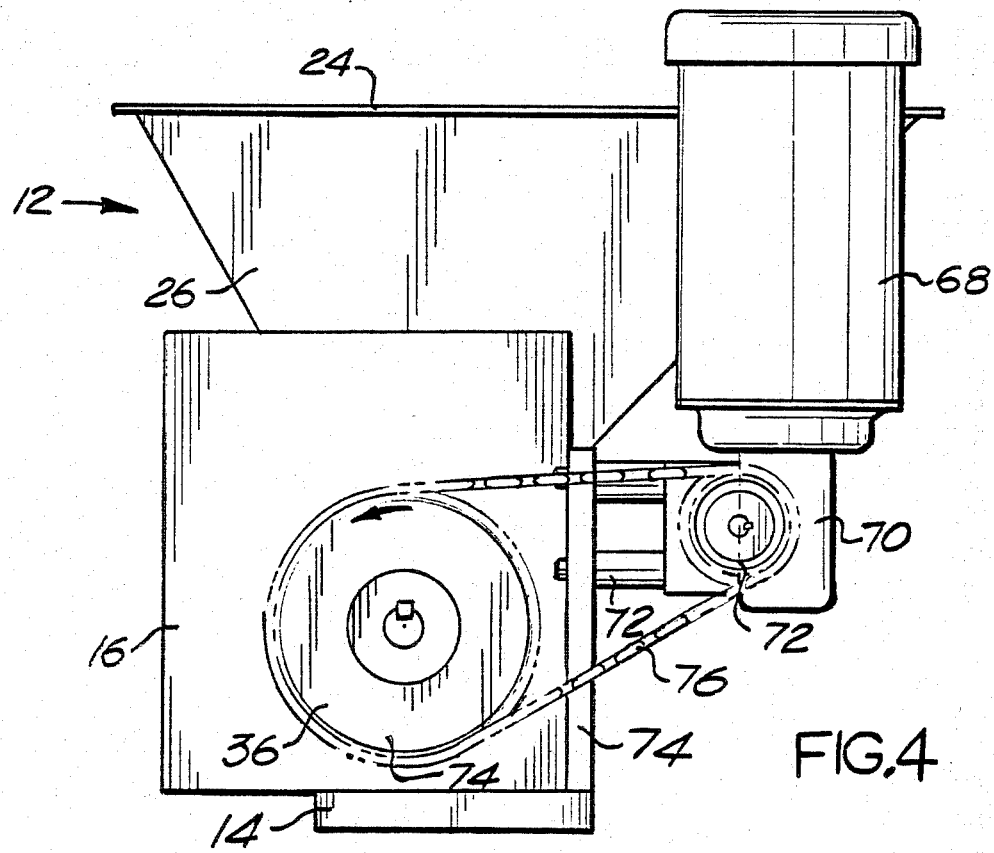

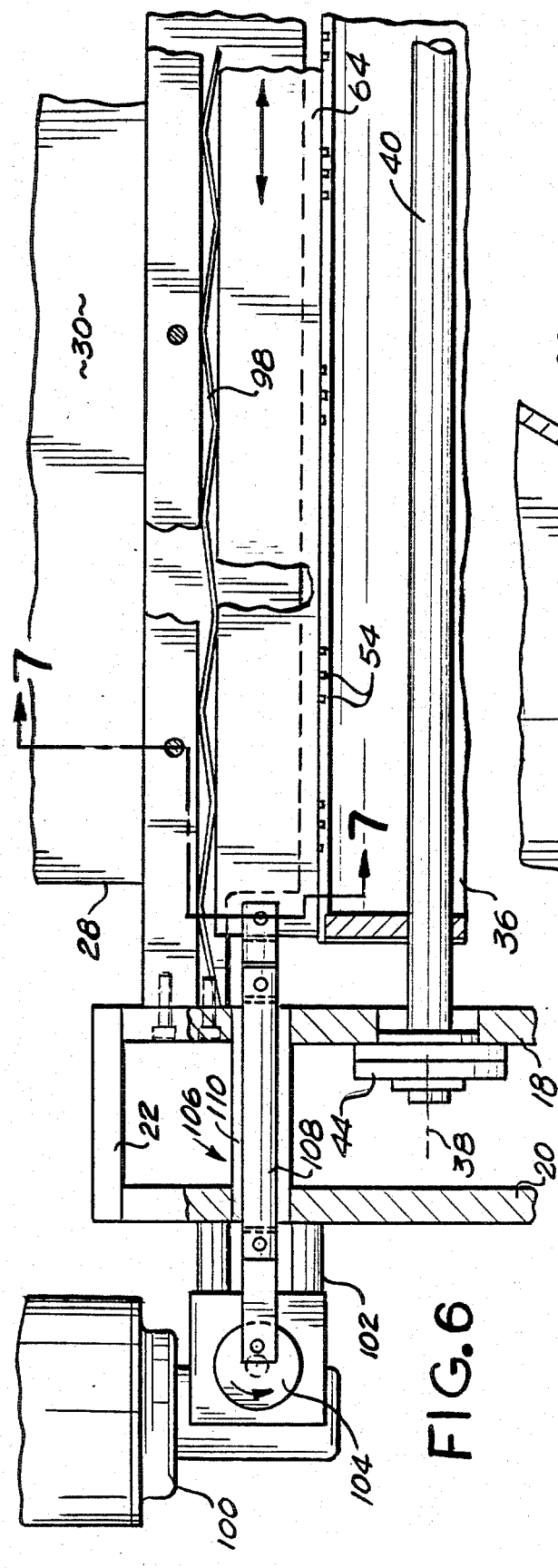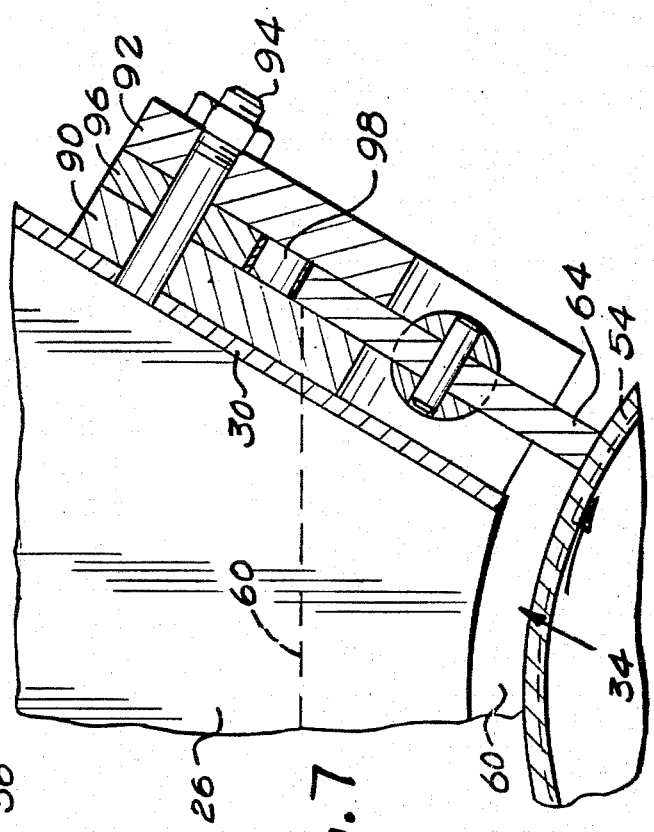

DISPENSING APPARATUS WITH RECIPROCATING BLADE

The subject invention is directed toward the art of dispensing apparatus and, more particularly, to an apparatus particularly suited for dispensing dry, particulate material onto a subjacent surface in a uniform dispersion pattern.

The invention is specially suited for use in dispensing salt onto unbaked sheets of soda crackers or the like, and will be described in particular reference thereto; however, it should be appreciated that the invention is capable of broader application and could be used for dispensing a variety of somewhat similar materials.

In the production of soda crackers sheets of the unbaked soda crackers are passed under apparatus for applying salt to the upper surface. Typically, in the past, this apparatus has comprised means for providing a cascade or waterfall of salt onto the crackers as they are conveyed along a continuous conveyor. The prior apparatus has been deficient in that the salt was not uniformly dispersed and, control of the total amount of salt was not particularly effective. Additionally, a substantial amount of salt was wasted because of the inability to fully control the dispensing. The subject invention overcomes the above problems and provides an apparatus which can dispense salt and similar granular materials extremely uniformly in closely regulated amounts. The apparatus is such that the dispensing operation can be started and stopped with substantial control. In addition apparatus formed according to this subject invention is simple to construct and easy to maintain.

In accordance with the subject invention the apparatus preferably comprises an elongated hopper assembly adapted to hold a supply of the particulate material. The hopper includes a pair of side members which define a generally horizontally extending longitudinal discharge mouth. Positioned within the mouth is an elongated, cylindrical drum member which extends the length of the mouth with the outer surface of the drum member closely spaced to the sides to substantially close the discharge mouth. Formed in the outer surface of the drum are a multiplicity of narrow, shallow grooves which extend circumferentially about the drum. The grooves are closely and uniformly spaced along the length of the drum. The size of the grooves is such that the particulate material in the hopper will normally not flow through the grooves unless the drum is rotated. Means are provided for selectively rotating the drum member in at least a first direction to thereby cause the particulate material in the hopper assembly to be carried in the grooves and discharged from the assembly in the direction of rotation of the drum. In addition, a multiplicity of divider-deflector members are mounted adjacent the drum member on the discharge side thereof as determined by the direction of rotation. Portions of the divider-deflector members extend into the grooves for deflecting and dispersing the particulate material carried therein.

By controlling the speed of rotation of the drum the quantity of material discharged in a period of time can be closely controlled. In addition, by controlling the stopping and starting of drum rotation the dispensation can be readily stopped and started in coordination with the movement of material beneath the dispensing assembly.

Preferably, in accordance with a more limited aspect of the invention, wiper blades extend from the sides of the hopper assembly into sliding engagement with the drum surface. These wiper blades serve to prevent any unwanted discharge of material over the surface of the drum except that carried in the grooves themselves. In addition, the invention also contemplates that the wiper blade on the discharge side of the drum member can be reciprocated to aid and assist in completely filling the grooves with the particulate material so that starvation of a groove cannot take place because of bridging by the particulate material in the drum.

Accordingly, a primary object of the invention is the provision of a simple, highly effective apparatus for uniformly dispensing salt and similar particulate materials in closely controlled quantities over a subjacent surface.

A further object of the invention is the provision of an apparatus of the type described in which the amount of material dispensed in any time period can be controlled by simply controlling the speed of rotation of a single dispensing drum member.

Yet another object is the provision of an apparatus of the type described in which the dispensing function can be stopped and started readily.

The above and other objects and advantages of the invention will become apparent from the following description when read in conjunction with the accompanying drawings wherein:

FIG. 1 is a side elevation of a preferred form of dispensing apparatus formed in accordance with the subject invention;

FIG. 2 is an enlarged view of the dispensing drum member used in the apparatus shown in FIG. 1;

FIG. 2A is an enlarged, cross-sectional view of the circled area of FIG. 2;

FIG. 3 is a sectional view taken on line 3—3 of FIG. 1;

FIG. 4 is an elevational view of the right end of the apparatus shown in FIG. 1;

FIG. 5 is a detailed showing of a divider-deflector member used in the apparatus of FIG. 1;

FIG. 6 is a cross-sectional elevational view taken on line 6—6 of FIG. 3 showing in detail the wiper blade assembly used on the discharge side of the drum; and, FIG. 7 is a cross-sectional view taken on line 7—7 of FIG. 6.

Referring more particularly to the drawings, the overall arrangement of the dispensing apparatus can best be understood by reference to FIGS. 1, 3 and 4. As shown, the dispensing apparatus 10 preferably an elongated, horizontally positioned hopper assembly 12 which is adapted to be mounted horizontally above a subjacent surface. In the embodiment shown the hopper assembly 12 is suitably supported from a base plate or mounting member 14 by three vertically extending plate members 16, 18 and 20. The upper ends of plates 18 and 20 are joined by a transversely extending plate member 22.

In the embodiment under consideration, the hopper assembly 12 includes an open top 24 and pair of vertically extending end walls 26 and 28. Inclined front and rear sidewalls 30, 32, respectively, are joined to the end walls 26 and 28 to define a hopper having a longitudinally extending open and downwardly extending discharge mouth 34.

Extending horizontally under the hopper assembly 12 and substantially closing the discharge mouth 34 is an elongated, cylindrical drum member 36. Drum member 36 is mounted for rotation about a horizontal axis 38 which extends parallel to the discharge mouth 34 of hopper assembly 12. As shown, drum assembly 36 is carried from a suitable center shaft 40 mounted for rotation in bearings 42, 44 supported from vertical support plates 16 and 18, respectively. The details of drum member 36 are best shown in FIG. 2. As will be noted, the drum is constructed from an elongated tubular member 48 having its opposite ends closed by disc-shaped plates 50, 52 suitable welded or otherwise connected to tube 48. The shaft 40 extends through plates 50, 52 and is likewise positively connected thereto.

Of particular importance to the subject invention is the contruction of the outer surface of the drum member 36. As can be seen, the outer surface of the drum member 36 is provided with a multiplicity of small, closely spaced grooves or slots 54 which extend circumferentially about the drum generally throughout its length. The size of the grooves 54 is comparatively important to the invention. Their size does, however, depend upon the grain size of the particulate material being dispensed. By making them sufficiently small the particulate material will now flow through the grooves while the drum is in position as best shown in FIGS. 1 and 3. The best size for the grooves can, however, be arrived at through simple experimentation; however, for common salt a groove size of approximately $\frac{1}{8}'' \times \frac{1}{8}''$ is suitable.

In order to further seal between the outer surface of drum 36 and the hopper assembly discharge mouth 34, suitable end plate members 58 and 60 are connected to the end wall of the hopper and extend down closely adjacent of the surface of drum member 36. Additionally, wiper blades 62 and 64 are mounted from hopper walls 32, 30, respectively. These wiper blades further prevent flow of the particulate material between the hopper walls and the drum surface. The wiper blades can be formed from a variety of materials; however, nylon or polypropylene is preferred.

As mentioned, the particulate material will not normally flow through grooves 54 when the drum member 36 is stationery. However, upon rotation of the drum member flow will take place and the particulate material will be conducted from within the hopper by virtue of the grooves 54. The direction of discharge from the hopper assembly 12 is controlled by the direction of rotation of the drum member 36. In the embodiment under consideration, the drum is rotated in a clockwise direction as viewed in FIG. 3.

To provide for selective rotation of drum member 36, the assembly includes an electric motor 68 which includes a rightangle gear drive unit 70. As best shown in FIGS. 1 and 4, the motor 68 and its gear unit 70 are suitably supported by a bracket 72 carried from a vertically extending plate 74 joined to vertical plate 16. The motor gear assembly is drivingly connected to drum 36 through sprockets 72, 74 and a chain 76. As shown, the sprockets 72 and 74 are suitably keyed or otherwise positively connected to the drive shaft extending from the right angle gear unit 70 and to the drum shaft 40.

During rotation of the drum 40 in a clockwise direction as viewed in FIG. 3, the salt or other particulate material within the hopper assembly 12 is conducted in a clockwise direction from the hopper 12. Continued rotation of the drum causes the salt to be discharged vertically downwardly. In order to achieve a better and more complete distribution of the salt, a series of divider-deflector members 80 are positioned at about the three o'clock position of the drum as viewed in FIG. 3. Note that a multiplicity of such divider members 80 are carried by a horizontally extending shaft 82 which extends between support plates 16 and 18 (see FIG. 1). As shown in FIG. 5 the divider-deflector members 80 each have a tapered narrow end portion 84 which is mounted to extend within a corresponding one of the drum grooves 54. The divider end point portions 84 are preferably positioned to extend directly into the grooves 54. In the embodiment shown the members 80 are mounted on the shaft 82 so that they actually pivot into light engagement with the bottom of the rectangular grooves 54. Consequently, as the drum rotates past the members 80, the salt carried within the groove is divided and deflected to disperse it as it falls from the drum. In addition, according to a further feature of the invention, still greater dispersion and additional deflection of the salt is preferably achieved by use of a horizontally extending, downwardly directed, deflector plate member 88 which is positioned as best shown in FIGS. 1 and 3. As shown, the plate member 88 extends the length of the drum directly beneath the divider-deflector members 80. The deflector plate 88 is suitably supported from the vertical support plate 16 and 18. As can be appreciated, by selectively controlling the speed of rotation of drum 36 the amount of salt discharged from the hopper assembly 12 in any given time period can be closely controlled. Addtionally, merely by stopping and starting the drum rotation the flow or discharge of material can be controlled.

Under certain operating conditions or with certain types of particulate material there is sometimes the possibility that the material will bridge over the grooves 54 or that certain of the grooves will not be completely filled with material. To overcome this condition, the preferred embodiment of the invention is arranged so that wiper member 64 (located on the discharge side of the discharge mouth 34) can be reciprocated. As best shown in FIGS. 1, 6 and 7, wiper blade 64 is slidably mounted between a pair of spaced plates 90, 92 which are connected to the side 30 of the hopper assembly in any convenient matter such as through the use of a plurality of stud bolts 94. A plate 96 extends between the upper ends of the plates 90, 92 to maintan them spaced a distance equal to the thickness of the wiper blade 64 (see FIG. 7). The blade 64 is continually biased toward the drum surface by an elongated spring member 98 which acts between the bottom of spacer plate 96 and the upper edge of the wiper blade 64. Selective reciprocation of the wiper blade 64 is produced by an electric motor 100 carried from a bracket 102 extending outwardly from a vertical support plate 20. The output shaft from the right angle gear unit 102 is connected to a crank 104 which is, in turn, connected to a connecting drive assembly 106 which joins with the left-hand end of wiper blade 64 as viewed in FIGS. 1 and 6. The connecting drive assembly 106 includes a slide rod 108 suitably mounted in a tube 110 extending between vertical support plates 18 and 20. A connecting rod is connected between the left end of shaft 108 and the crank 104. As can be appreciated, during reciprocation of the wiper blade 64 the salt is agitated in the area closely adjacent the discharge from the unit. This causes the slots 54 to be uniformly filled and, in addition, any tendency toward bridging of the grooves by the salt is prevented.

As can be seen, the subject invention provides an extremely simple, highly efficient discharge and dispensing apparatus for dry particulate materials.

Having thus described our invention we claim:

1. Apparatus for dispensing a comparatively fine particulate material in a generally uniform pattern over a subjacent surface comprising:

a hopper assembly for holding a supply of said particulate material, said hopper assembly adopted to be positioned above said subjacent surface and having a pair of spaced sides defining a generally horizontally extending longitudinal discharge mouth;

an elongated, cylindrical drum member extending the length of said discharge mouth with the outer surface of said drum member closed spaced to said spaced sides to substantially close said discharge mouth;

a multiplicity of narrow, shallow grooves extending circumferentially about the surface of said drum, said grooves being closely and uniformly spaced along the length of said drum;

means for selectively rotating said drum member in at least a first direction to cause particulate material in said hopper assembly to be carried in said grooves and discharged from said assembly in the direction of rotation, a multiplicity of divider-deflector members mounted adjacent said drum member on the discharge side thereof as determined by the direction of rotation with portions extending into said grooves for deflecting and dispersing particulate material carried therein, elongated wiper blade members extending downwardly from the spaced sides of said hopper member and having sliding engagement with said drum; and, means for reciprocating the wiper blade member on the discharge side of said drum.

2. The apparatus as defined in claim 1 further including a downwardly inclined deflector plate extending longitudinally under said divider-deflector members.

3. The apparatus as defined in claim 1 wherein a separate one of said divider-deflector members is associated with each circumferential groove.

4. The apparatus as defined in claim 1 in which the grooves have a generally rectangular cross-section.

* * * * *